(12) United States Patent
Di Parma et al.

(10) Patent No.: US 8,534,696 B2
(45) Date of Patent: Sep. 17, 2013

(54) CARRIER DEVICE

(75) Inventors: Raffaele Di Parma, Markgroeningen (DE); Bert Wegner, Gingen (DE); Joerg Riehle, Asperg (DE)

(73) Assignee: Scambia Holdings Cyprus Limited, Limassol (CY)

( * ) Notice: Subject to any disclaimer, the term of this patent is extended or adjusted under 35 U.S.C. 154(b) by 70 days.

(21) Appl. No.: 13/205,375

(22) Filed: Aug. 8, 2011

(65) Prior Publication Data

US 2013/0038040 A1 Feb. 14, 2013

(51) Int. Cl.
*B60D 1/24* (2006.01)

(52) U.S. Cl.
USPC ........................................ 280/506; 280/491.5

(58) Field of Classification Search
USPC ........................................ 280/506, 507, 491.5
See application file for complete search history.

(56) References Cited

U.S. PATENT DOCUMENTS

| | | | | |
|---|---|---|---|---|
| 5,449,101 A * | 9/1995 | Van Dusen | ................... | 224/506 |
| 5,593,172 A * | 1/1997 | Breslin | ........................ | 280/506 |
| 6,010,144 A * | 1/2000 | Breslin | ........................ | 280/506 |
| 6,105,989 A * | 8/2000 | Linger | ......................... | 280/506 |
| 6,974,147 B1 * | 12/2005 | Kolda | ........................... | 280/506 |
| 7,717,455 B2 * | 5/2010 | Morris | ......................... | 280/506 |
| 7,823,904 B2 * | 11/2010 | Coy | ............................. | 280/506 |
| 8,262,121 B2 * | 9/2012 | Beck | ............................. | 280/504 |
| 8,308,185 B2 * | 11/2012 | Weaver | ........................ | 280/506 |
| 2009/0014983 A1 * | 1/2009 | McKendry | .................... | 280/506 |
| 2009/0115165 A1 * | 5/2009 | Coy | ............................. | 280/506 |
| 2010/0283225 A1 * | 11/2010 | Lahn | ............................. | 280/506 |

* cited by examiner

*Primary Examiner* — Kevin Hurley
(74) *Attorney, Agent, or Firm* — Reinhart Boerner Van Deuren P.C.

(57) ABSTRACT

A carrier device for mounting at a rear side of a body of a vehicle, said carrier device comprising, a receiving element, adapted to be fixed to the body of said vehicle, said receiving element comprising a receiving channel with an insert opening, a carrier element, adapted to be releaseably received in said receiving element in a mounted position, said carrier element being insertable into said receiving channel to arrive at its mounted position by movement through said insert opening in direction parallel to a longitudinal direction of said receiving channel, a locking unit for locking said carrier element in said mounted position in said receiving element, a key unit comprising a first key element arranged on said receiving element and a second key element arranged on said carrier element said first and second key elements cooperating in a keying position of said carrier element in order to only allow said carrier element provided with said second key element to arrive at the mounted position when inserted into said receiving channel.

25 Claims, 6 Drawing Sheets

CARRIER DEVICE

The invention relates to a carrier device for being mounted at a rear side of a body of a vehicle, said carrier device comprising, a receiving element, adapted to be fixed to the body of said vehicle, said receiving element comprising a receiving channel with an insert opening, a carrier element, adapted to be releaseably received in said receiving element in a mounted position, said carrier element being insertable into said receiving channel to arrive at its mounted position by movement through said insert opening in direction parallel to a longitudinal direction of said receiving channel, a locking unit for locking said carrier element in said mounted position in said receiving element.

This kind of carrier devices is well known for vehicles, in particular in these carrier devices the carrier element is designed as a carrier bar which for example carries a ball for a ball mount used for hauling a trailer.

However, the user of such a carrier device not always uses a carrier element authorized for the specific carrier device, in particular authorized in order to achieve the safety standards for such carrier device.

If a non-authorized carrier element is used safety problems can occur which can end up in dangerous driving situations for said vehicle.

It is therefore, the object of the present invention to provide a carrier device with increased safety.

SUMMARY OF THE INVENTION

According to the present invention a carrier device for being mounted at the rear side of a body of a vehicle comprises a receiving element, adapted to be fixed to the body of said vehicle, said receiving element comprising a receiving channel with an insert opening, a carrier element, adapted to be releaseably received in said receiving element in a mounted position, said carrier element being insertable into said receiving channel to arrive at its mounted position by movement through said insert opening in direction parallel to a longitudinal direction of said receiving channel, a locking unit for locking said carrier element in said mounted position, a key unit comprising a first key element arranged on said receiving element and a second key element arranged on said carrier element, said first and second key elements cooperating in a keying position of said carrier element in order to allow said carrier element provided with said second key element to arrive at the mounted position when inserted into said receiving channel.

The advantage of such a key unit is that it prevents unauthorized carrier elements to be used with a carrying device according to the present invention so that it can be ascertained that the safety standard of said carrier device is maintained.

In connection with the locking unit as defined before the various features of said locking unit have not been defined.

In one version of the invention said locking unit comprises a locking bar which in its locking position extends through at least one, preferably two openings in the receiving element and through an opening in the carrier element if the carrier element is in its mounted position.

In particular in such a preferred solution said locking bar in its locking position extends transverse to the longitudinal direction of said receiving channel.

Further preferably the locking bar in its locking position extends through a transverse opening in said carrier element.

In one version of the invention the first key element comprises a key body arranged in said receiving channel.

In principle said key body can be arranged in any position within said receiving channel.

One preferred solution provides that said first key element is arranged on a side of said locking unit opposite to said insert opening.

In a further version said first key element extends in said receiving channel transverse to said longitudinal direction of said receiving channel.

In a particular solution said first key element comprises a first key surface which cooperates in said keying position with a second key surface of said second key element.

Said second key element can be designed in different manners.

One solution according to the present invention provides that said second key element is a recess arranged on said carrier element.

One particular solution provides that said recess is arranged on an end portion of said carrier element which is received by said receiving channel.

In particular said second key surface is represented by an inner surface of said recess.

One specific embodiment provides that said recess is V-shaped and opening towards an end face of said end portion of said carrier element.

According to a further solution of the inventive concept the object outlined before is solved by a carrier device for being mounted at a rear side of a body of a vehicle, comprising a receiving element adapted to be fixed to the body of said vehicle, said receiving element comprising a receiving channel with an insert opening, a carrier element, adapted to be insertable into said receiving channel to arrive at a mounted position by movement through said insert opening in direction parallel to a longitudinal direction of said receiving channel, a locking unit for locking said carrier element in said mounted position in said receiving element and a clamping element moveable between a clamping position and a release position, said clamping element in its clamping position acting on said carrier element in order to clamp said carrier element in said receiving element.

The advantage of the present invention can be seen in the fact that the clamping element enables the user of a carrier device to reduce play between the carrier element and the receiving element and play between the various parts of the locking unit.

In principle such clamping element could be arranged on said carrier element.

One particular solution provides that said clamping element is arranged on said receiving element which makes it easier to operate said clamping element.

One version of particular advantage according to the present invention provides that said clamping element in its clamping position acts on said carrier element in order to clamp said carrier element in cooperation with said locking unit.

In a particular solution said clamping element in its clamping position acts on said carrier element in order to clamp said carrier element against a locking action of said locking unit.

In order to provide a clamping action one specific solution provides that said clamping element comprises a wedge surface for acting on said carrier element.

In a particular embodiment said clamping element wedges said carrier element with said wedge surface.

One particular solution provides that said wedge surface is moveable relative to said receiving element in order to provide the clamping action.

In particular said wedge surface is moveable relative to said carrier element in its mounted position.

One particular solution provides that said wedge surface is a cam surface.

A specific solution provides that said cam surface is acting on said carrier element by movement of said clamping element with respect to said receiving element.

In one particular solution said clamping element is mounted on said receiving element in a rotatable manner.

In a particular version said clamping element acts with said cam surface on said carrier element by rotation of said clamping element with respect to said receiving element.

In principle the clamping element can be an element different from key elements of said key unit.

One particular solution however provides that said carrier device comprises a key unit having a first key element arranged on said receiving element and a second key element arranged on said carrier element, said first and second key elements cooperating in a keying position of said carrier element in order to allow said carrier element provided with said second key element to arrive at the mounted position when inserted into said receiving channel and that said key element is also acting as said clamping element.

Further features of the present invention are subject matter to the following detailed specification and the drawings.

DETAILED SPECIFICATION

Figure 1:
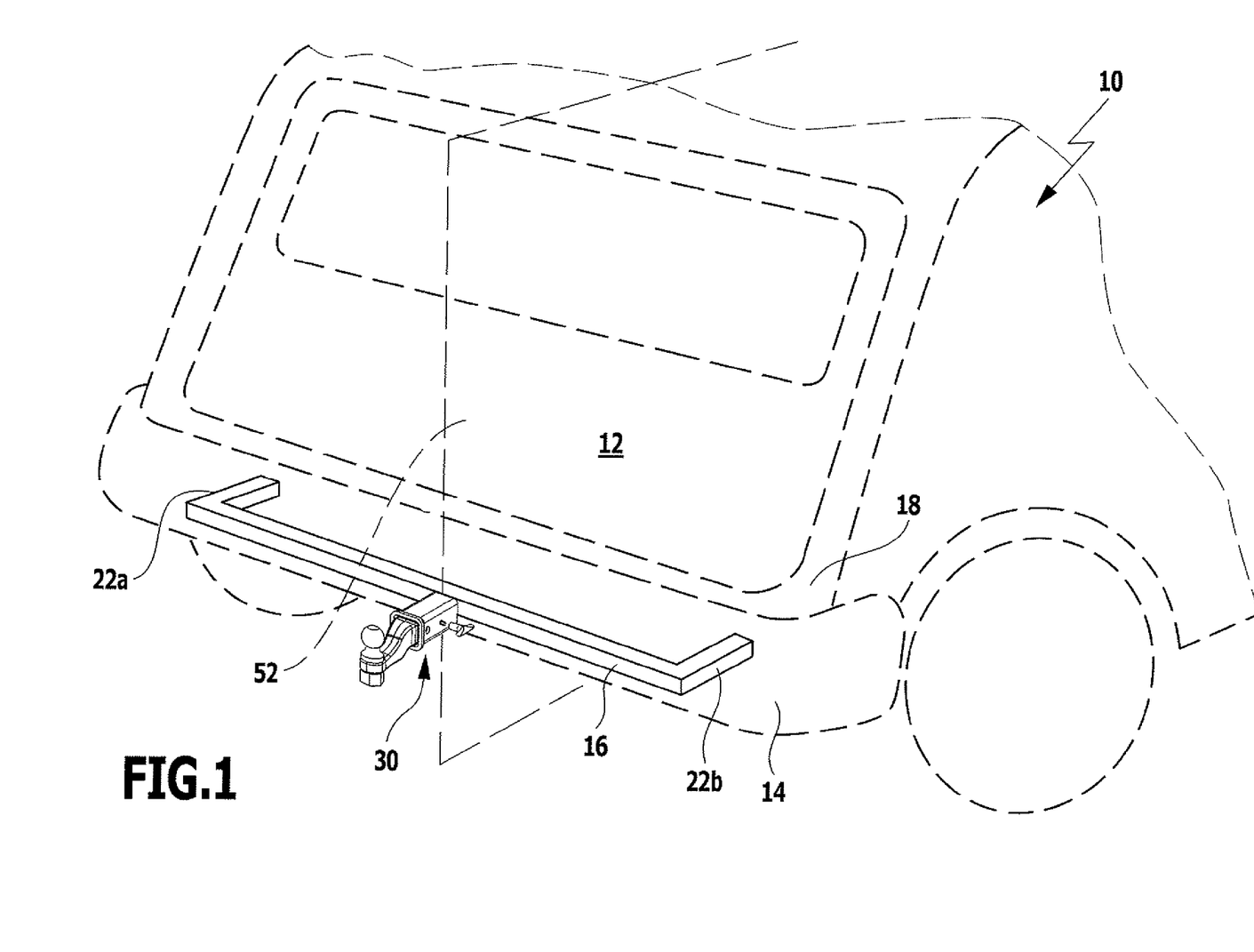
FIG. 1 shows a schematic rear view of a body of a vehicle with a carrier device according to the present invention.

FIG. 1 shows a rear portion 12 of a body 10 of a vehicle in dashed lines, in particular of a sports utility vehicle, which is provided with a rear bumper unit 14 which at least in part covers a cross bar 16 extending along a lower rear portion 18 of the body 10 and is connected for example by fixing struts 22a and 22b to body 10.

Figure 2:
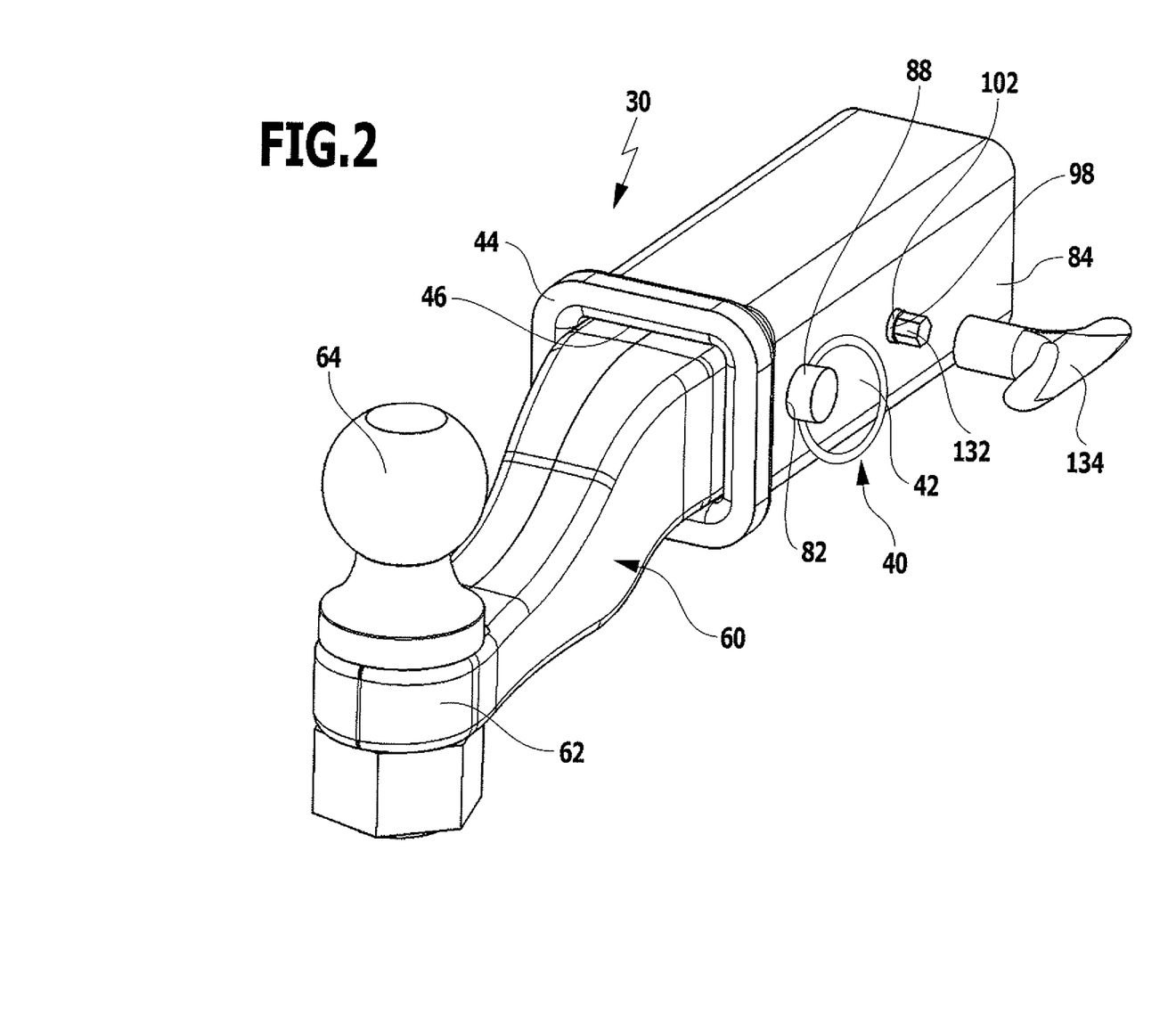
FIG. 2 shows a perspective view of said carrier device.

A carrier device 30 is held by cross bar 16 and said carrier device 30, as shown in FIGS. 1 and 2, comprises a receiving element 40 connected to cross bar 16 and provided with a tube-like structure 42 and with and end flange 44 said end flange 44 surrounding an insert opening 46 of a receiving channel 48 inside said tube-like structure 42 extending in a longitudinal direction 50 which runs essentially parallel to a longitudinal central plane 52 of body 10.

Figure 3:
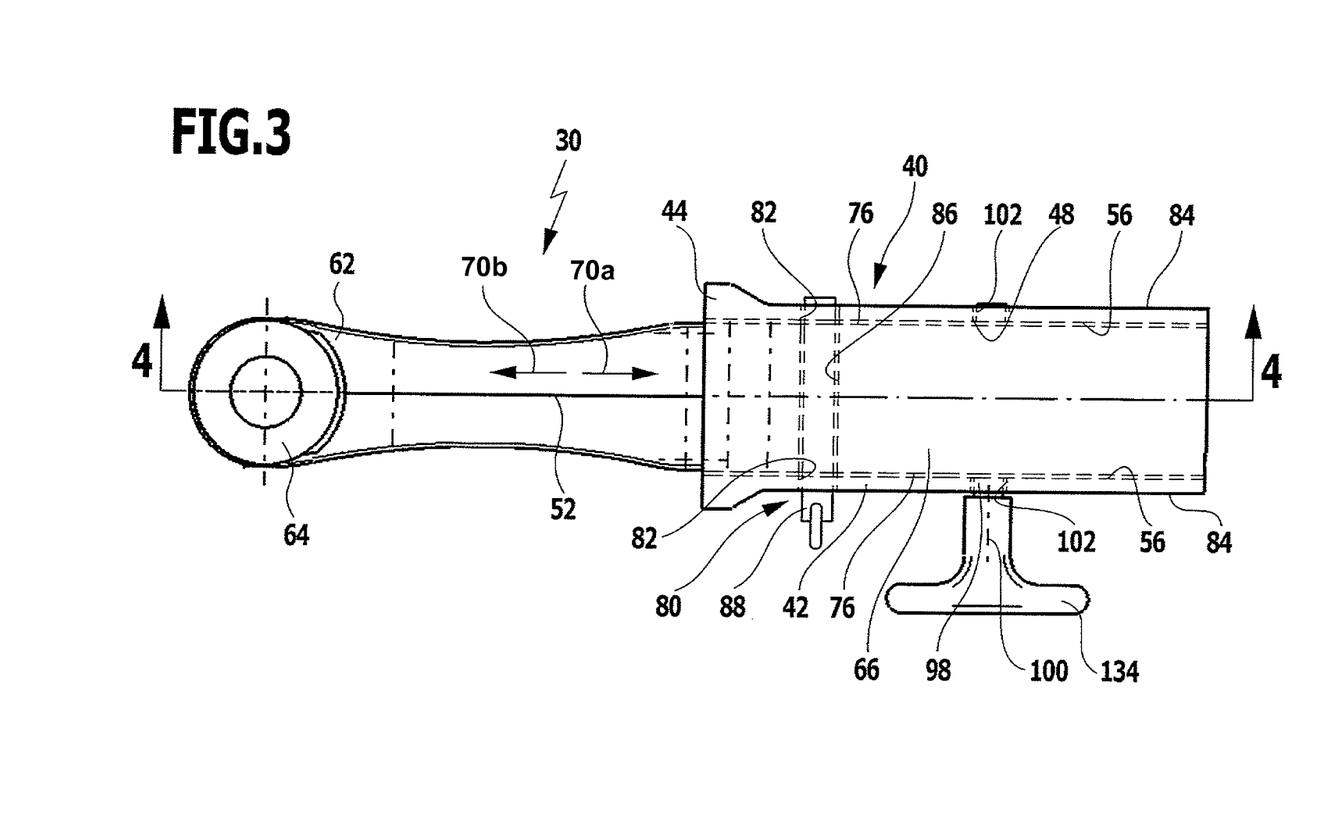
FIG. 3 shows a top view of said carrier device.
Figure 4:
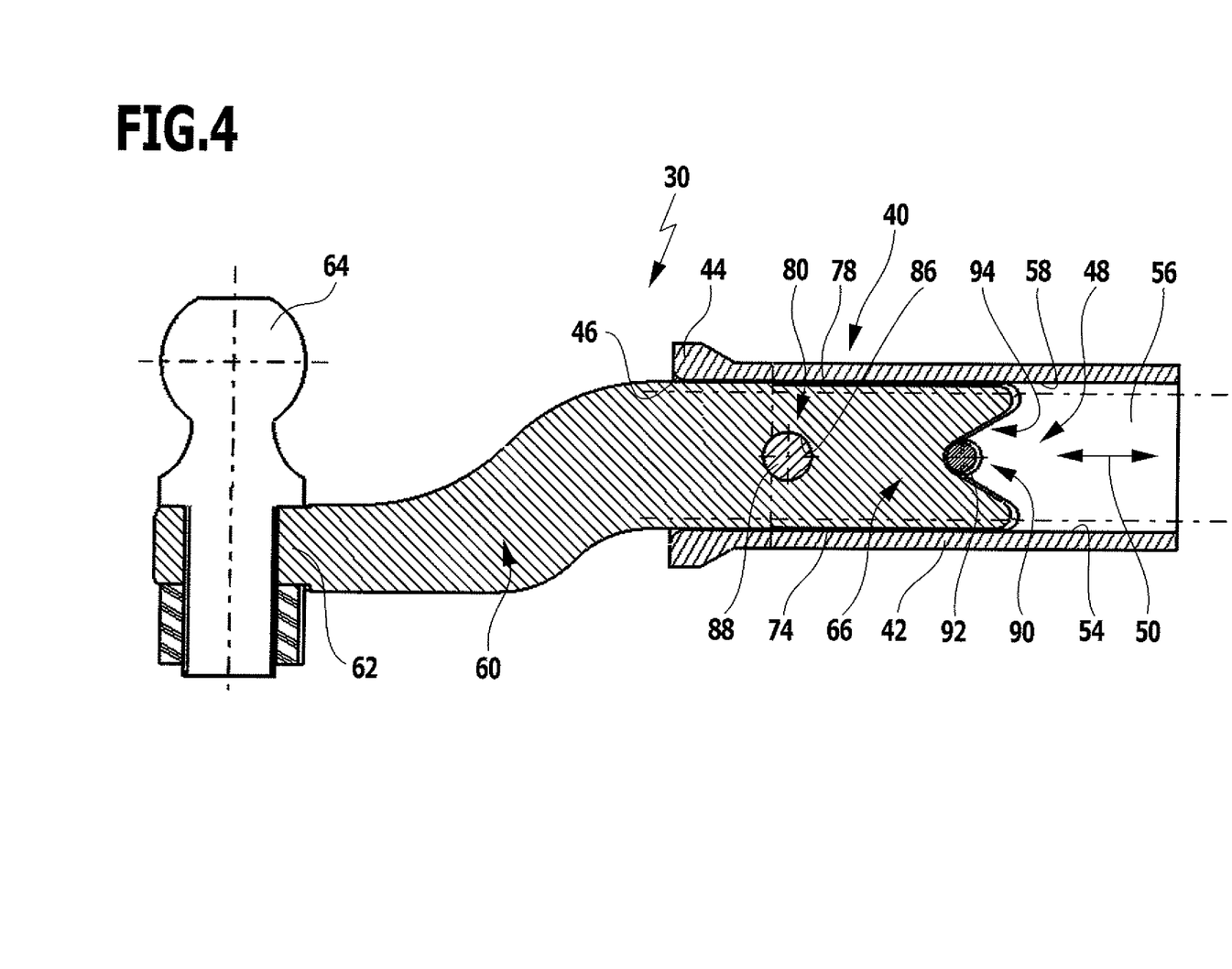
FIG. 4 is a sectional view along line 4-4 in FIG. 3.

Receiving channel 48 is surrounded by four flat surfaces extending parallel to longitudinal direction 50 and forming a bottom surface 54, two side surfaces 56 and a top surface 58. Bottom surface 54 and top surface 58 as well as side surfaces 56 extend parallel to each other so that receiving channel 48 is provided with an essentially rectangular or square cross section (FIG. 2 to 4).

Carrier device 30 further comprises a carrier element or carrier bar 60 having a first end portion 62 which carries for example a ball 64 for a ball mount of a trailer, but end portion 62 can also carry any other unit, for example a bicycle carrier or any other load carrying device.

Carrier bar 60 further comprises a second end portion 66 opposite to said first end portion 62, said second end portion 66 being designed to be releaseably received in receiving channel 48 of receiving element 40.

Second end portion 66 therefore is provided with an outer cross section having four flat surfaces, for example a bottom surface 74, two side surfaces 76 and a top surface 78, which can be brought in abutment with bottom surface 54, side surfaces 56 and top surface 58 of receiving channel 48 when second end portion 66 is introduced into receiving channel 48 by moving end portion 66 through insert opening 46 in an insert direction 70a running parallel to longitudinal direction 50 until second end portion 66 reaches a mounting position within receiving channel 48.

For locking carrier bar 60 with its second end portion 66 in receiving channel 48 a locking unit 80 is provided. Said locking unit 80 comprises openings 82 in tube like structure 42, for example in opposite side walls 84 of tube like structure 42, as well as an opening 86 extending through second end portion 66 of carrier bar 60, opening 86 being flush with recesses 82 in sidewalls 84 if the second end portion 66 of carrier bar 60 is in its mounting position.

Further locking unit 80 comprises a locking bolt 88 which is adapted to extend through openings 82 in side walls 84 and transverse to longitudinal direction 50 through channel 48 and through opening 86 in second end portion 66 if the carrier bar 60 is in its mounted position.

Locking bolt 88 therefore enables locking of second end portion 66 of carrier bar 60 in receiving element 40 against movement parallel to longitudinal direction 50 of receiving channel 48.

Carrier device 30 is fully operative if the second end portion 66 of carrier bar 60 is locked in receiving elements 40 by locking bolt 88 of locking unit 80.

In order to prevent the user of carrier device 30 from using unauthorized carrier bars 60 not having the safety design necessary for carrier device 30 and not being adapted to the safety standard for such carrier device 30, carrier device 30 is provided with a key unit 90 (FIGS. 4 and 5) allowing only an authorized carrier element 60 to reach the mounted position in said receiving channel 48 in which it can be locked by locking unit 80 if a first key element 92 and a second key element 94 of key unit 90 are in a keying position relative to each other.

Figure 5:
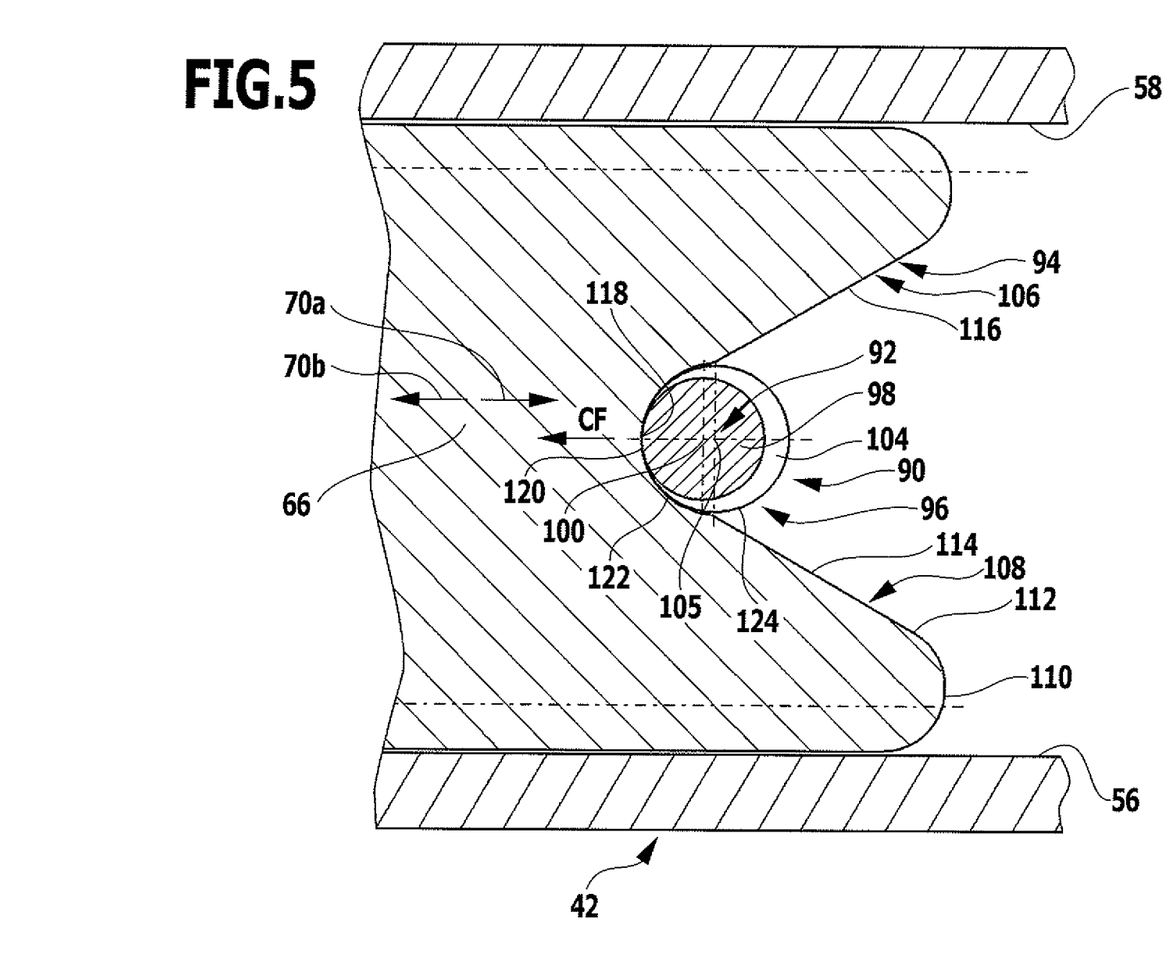
FIG. 5 shows the sectional view of FIG. 4 with the key unit in enlarged scale and FIG. 6 is a schematic view similar to FIG. 2 with the key unit operated by a handle.

For example first key element 92 is provided with an outer surface 96 representing a first key surface. According to the present embodiment first key element 92 comprises a shaft portion 98 which is mounted rotatably about an axis of rotation 100 in receiving element 40, for example shaft portion 98 extends through bores 102 in both opposite side walls 84 of tube like structure 42 so that the bores 102 form bearings for the shaft portion 98 which is then rotatable about axis of rotation 100 with respect to receiving element 40.

However the first key surface 96 is not the other surface of shaft portion 98 but the outer surface of an excentric cam element 104 having, for example a circular cross section with a center 105 arranged at a distance from the axis of rotation 100 arranged on shaft portion 98 between side walls 84 of tube-like structure 42 inside receiving channel 48 so that rotation of shaft portion 98 about the axis of rotation 100 leads to a rotation of excentric cam element 104 carrying first key surface 96.

A second key surface 106 is formed by a V-shaped notch 108 which is extending from end face 110 of second end portion 66 into second end portion 66 of carrier bar 60 with an opening 112 arranged in end face 110. Two side surfaces 114, 116 of said V-shaped notch 108 are extending from said end face 110 towards base surface 118 of said V-shaped notch 108 which base surface 118 is connecting side surfaces 114 and 116 thereof.

Base surface 118 together with side surfaces 114 and 116 are forming the second key surface 106 which is abutting on first key surface 96 if carrier bar 60 is in its keying position, said keying position being also the mounted position within receiving channel 48 of receiving element 40, in which the second and portion 66 of carrier bar 60 can be locked by locking unit 80.

If for the present carrier device 30 a non authorized carrier bar 60 is used which is not provided with second key surface 106, such non authorized carrier bar 60 with its second end portion 66 will not be able to be positioned in the mounted position in which it can be locked by locking unit 80 because the V-shaped notch 108 is missing so that first key element 92 will prevent second end portion 66 from reaching the mounted position when inserted in insert direction 70 into receiving channel 48.

Consequently, key unit 90 will be able to prevent use of non-authorized carrier bars 60 in connection with carrier device 30 according to the present invention.

In addition due to the fact that first key surface 96 is arranged on cam element 104 being excentric to the axis of rotation 100 first key element 92 can be used to apply a clamping force CF on second end portion 66 by first key surface 96 abutting on second key surface 106.

As shown in FIG. 4 first key element 92 can be rotated in a release position in which a portion 120 of the first key surface 96 having minimum distance from the axis of rotation 100 faces insert opening 46. If in this position of key element 92 second end portion 66 is moved into receiving channel 48 parallel to insert direction 70 a portion 120 of first key surface 96 will abut on base surface 118 and in there will be sufficient play to enable insertion of locking bolt 88 into openings 82 and opening 86 of second end portion 66 easily.

If the first key element 92 is rotated about axis of rotation 100 to arrive at a clamping position it will act with surface portion 122 and then surface portions 124 of first key surface 106 on base surface 118 of second key surface 96 and due to an increasing distance of surface portions 122 and 124 from the axis of rotation 100 base surface 118 will be moved in a removal direction 70b counter to insert direction 70a towards locking unit 80, and since locking unit 80 blocks movement in said removal direction 70b clamping force CF acting on second end portion 66 will be created which will press second end portion 66 with opening 86 against locking bolt 88 and locking bolts 88 will be pressed against openings 82 in side walls 84 so that any play in locking unit 80 can be reduced, in particular minimized, which also reduces wear in locking unit 80 (FIG. 3 to 5).

Figure 6:
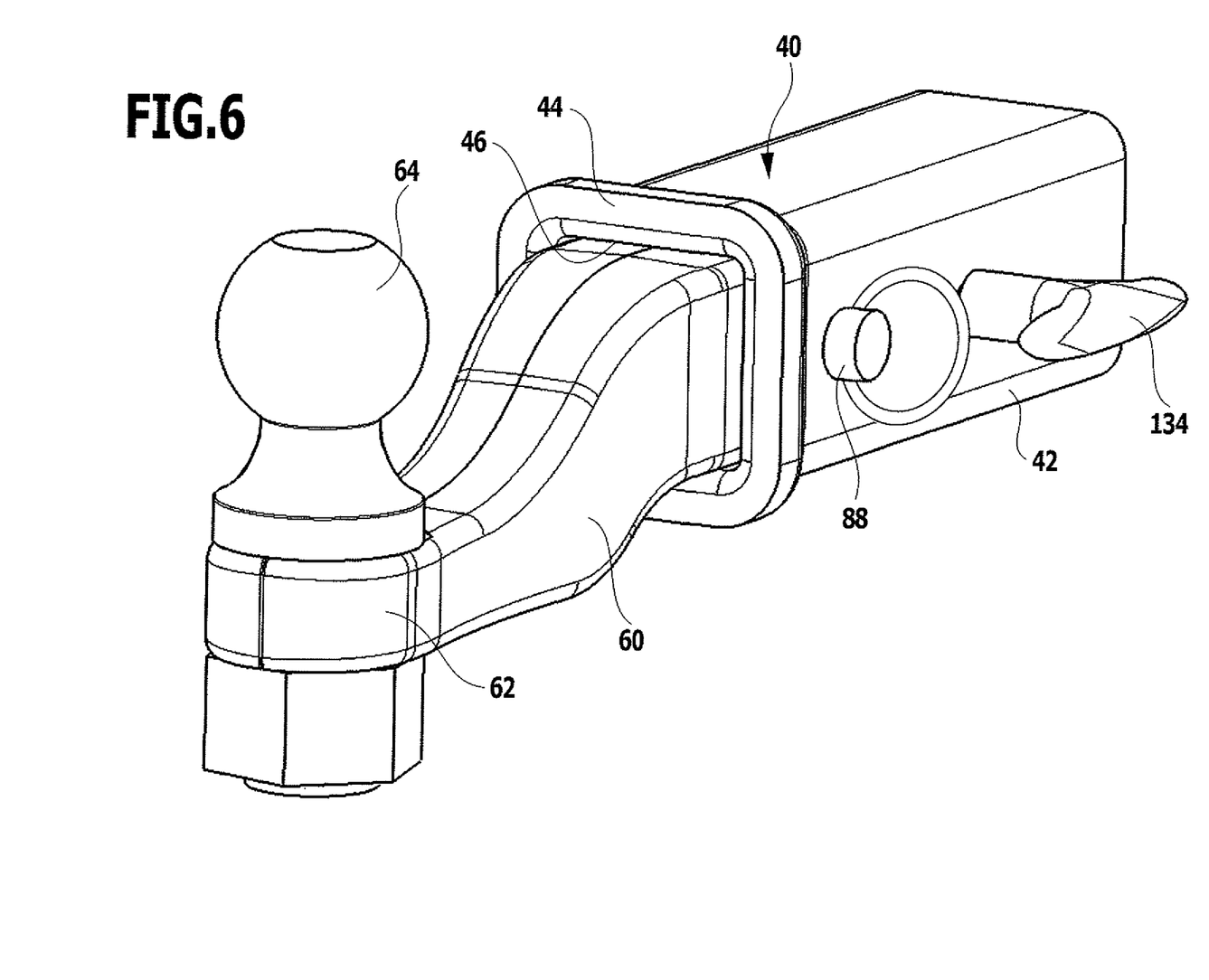

For example as shown in FIG. 2 first key element 92 is provided with a connection head 132 for being releaseably connectable to a handle 134 (FIG. 6), which is used to generate the rotational movement of the first key element 92 in order to provide the clamping action of said first key element 92.

The invention claimed is:

1. Carrier device for being mounted at a rear side of a body of a vehicle, said carrier device comprising,
    a receiving element, adapted to be fixed to the body of said vehicle, said receiving element comprising a receiving channel with an insert opening,
    a carrier element, adapted to be releaseably received in said receiving element in a mounted position, said carrier element being insertable into said receiving channel by movement in an insert direction to arrive at its mounted position by movement through said insert opening in direction parallel to a longitudinal direction of said receiving channel,
    a locking unit for locking said carrier element in only said mounted position in said receiving element,
    a key unit comprising a first key element arranged on said receiving element and a second key element arranged on said carrier element said first and second key elements cooperating in at least one keying position of said carrier element when moved in said insert direction in order to only allow said carrier element provided with said second key element to continue movement in said insert direction in order to arrive at the mounted position when inserted into said receiving channel.

2. Carrier device according to claim 1, wherein said locking unit comprises a locking bolt which in its locking position extends through a opening in the receiving element and through a opening in the carrier element if said carrier element is in its mounted position.

3. Carrier device according to claim 1, wherein said first key element comprises a key body arranged in said receiving channel.

4. Carrier device according to claim 3, wherein said first key element is arranged on a side of said locking unit opposite to said insert opening.

5. Carrier device according to claim 1, wherein said first key element extends in said receiving channel transverse to said longitudinal direction of said receiving channel.

6. Carrier device according to claim 1, wherein said first key element comprises a first key surface which cooperates in said keying position with a second key surface of said second key element.

7. Carrier device for being mounted at a rear side of a body of a vehicle, said carrier device comprising,
    a receiving element, adapted to be fixed to the body of said vehicle, said receiving element comprising a receiving channel with an insert opening,
    a carrier element, adapted to be releaseably received in said receiving element in a mounted position, said carrier element being insertable into said receiving channel to arrive at its mounted position by movement through said insert opening in direction parallel to a longitudinal direction said receiving channel,
    a locking unit for locking said carrier element in said mounted position in said receiving element,
    a key unit comprising a first key element arranged on said receiving element and a second key element arranged on said carrier element said first and second key elements cooperating in a keying position of said carrier element in order to only allow said carrier element provided with said second key element to arrive at the mounted position when inserted into said receiving channel, wherein said second key element is a recess arranged on said carrier element.

8. Carrier device according to claim 7, wherein said recess is arranged on an end portion of said carrier element which is received by said receiving channel.

9. Carrier device according to claim 8, wherein said second key surface is represented by an inner surface of said recess.

10. Carrier device according to claim 9, wherein said recess is V-shaped and opening towards an end face of said end portion of said carrier element.

11. The carrier device of claim 1, wherein the locking unit is disposed intermediate between the insert opening and the key unit.

12. Carrier device for being mounted at a rear side of a body of a vehicle, said carrier device comprising, a receiving element, adapted to be fixed to the body of said vehicle, said receiving element comprising a receiving channel with an insert opening, a carrier element, adapted to be insertable into said receiving channel to arrive at a mounted position by movement through said insert opening in direction parallel to a longitudinal direction of said receiving channel, a locking unit for locking said carrier element in said mounted position in said receiving element, an element moveable between a clamping position and a release position, said element in its clamping position acting on said carrier element with a clamping force oriented in a removal direction of said carrier element in order to clamp said carrier element in said receiving element.

13. Carrier device according to claim 12, wherein said element is arranged on said receiving element.

14. Carrier device according to claim 12, wherein said element in its clamping position acts on said carrier element in order to clamp said carrier element in cooperation with said locking unit.

15. Carrier device according to claim 14, wherein said element in its clamping position acts on said carrier element in order to clamp said carrier element against a locking action of said locking unit.

16. Carrier device according to claim 12, wherein said element comprises an outer surface for acting on said carrier element.

17. Carrier device according to claim 16, wherein said element wedges said carrier element with said outer surface.

18. Carrier device according to claim 16, wherein said outer surface is moveable relative to said receiving element.

19. Carrier device according to claim 16, wherein said outer surface is moveable relative to said carrier element in its mounted position.

20. Carrier device according to claim 16, wherein said outer surface is part of an eccentric cam element.

21. Carrier device according to claim 20, wherein said eccentric cam element is acting on said carrier element by movement of said element with respect to said receiving element.

22. Carrier device according to claim 21, wherein said element is mounted on said receiving element in a rotatable manner.

23. Carrier device according to claim 22, wherein said element acts with said eccentric cam element on said carrier element by rotation of said element with respect to said receiving element.

24. Carrier unit according to claim 12, wherein said carrier device comprises a key unit comprising a first key element arranged on said receiving element and a second key element arranged on said carrier element said first and second key elements cooperating in a keying position of said carrier element in order to only allow said carrier element provided with said second key element to arrive at the mounted position when inserted into said receiving channel and wherein said first key element is also acting as said element.

25. The carrier device of claim 12, wherein the loading unit is disposed intermediate between the insert opening and the element.

* * * * *

UNITED STATES PATENT AND TRADEMARK OFFICE
CERTIFICATE OF CORRECTION

PATENT NO. : 8,534,696 B2
APPLICATION NO. : 13/205375
DATED : September 17, 2013
INVENTOR(S) : Raffaele DiParma et al.

Page 1 of 1

It is certified that error appears in the above-identified patent and that said Letters Patent is hereby corrected as shown below:

In the Claims

Col. 6, Line 33-54, should read

--7. Carrier device for being mounted at a rear side of a body of a vehicle, said carrier device comprising, a receiving element, adapted to be fixed to the body of said vehicle, said receiving element comprising a receiving channel with an insert opening, a carrier element, adapted to be releaseably received in said receiving element in a mounted position, said carrier element being insertable into said receiving channel to arrive at its mounted position by movement through said insert opening in direction parallel to a longitudinal direction of said receiving channel, a locking unit for locking said carrier element in said mounted position in said receiving element, a key unit comprising a first key element arranged on said receiving element and a second key element arranged on said carrier clement said first and second key elements cooperating in a keying position of said carrier element in order to only allow said carrier element provided with said second key element to arrive at the mounted position when inserted into said receiving channel, wherein said second key element is a recess arranged on said carrier element.--.

Signed and Sealed this
Third Day of December, 2013

Margaret A. Focarino
*Commissioner for Patents of the United States Patent and Trademark Office*